(12) United States Patent
Dunham et al.

(10) Patent No.: US 11,176,042 B2
(45) Date of Patent: Nov. 16, 2021

(54) METHOD AND APPARATUS FOR ARCHITECTURAL CACHE TRANSACTION LOGGING

(71) Applicant: Arm Limited, Cambridge (GB)

(72) Inventors: Curtis Glenn Dunham, Austin, TX (US); Jonathan Curtis Beard, Austin, TX (US); Pavel Shamis, Austin, TX (US); Eric Ola Harald Liljedahl, Stockholm (SE)

(73) Assignee: Arm Limited, Cambridge (GB)

( * ) Notice: Subject to any disclaimer, the term of this patent is extended or adjusted under 35 U.S.C. 154(b) by 123 days.

(21) Appl. No.: 16/418,380

(22) Filed: May 21, 2019

(65) Prior Publication Data

US 2020/0371929 A1   Nov. 26, 2020

(51) Int. Cl.
*G06F 12/0815* (2016.01)
*G06F 12/10* (2016.01)
*G06F 11/34* (2006.01)
*G06F 11/30* (2006.01)

(52) U.S. Cl.
CPC ...... *G06F 12/0815* (2013.01); *G06F 11/3037* (2013.01); *G06F 11/3476* (2013.01); *G06F 12/10* (2013.01); *G06F 2212/1016* (2013.01); *G06F 2212/1032* (2013.01)

(58) Field of Classification Search
CPC ............. G06F 12/0815; G06F 11/3037; G06F 11/3476; G06F 12/10; G06F 2212/1032; G06F 2212/1016
See application file for complete search history.

(56) References Cited

U.S. PATENT DOCUMENTS 6,732,124 B1   5/2004  Koseki et al.
7,181,573 B2   2/2007  Wolrich et al.
7,333,106 B1 * 2/2008  Wu ................. G06T 15/405
                                                   345/421

(Continued)

OTHER PUBLICATIONS

Katsuyoshi Kitai, Tadaaki Isobe, Yoshikazu Tanaka, Yoshiko Tamaki, Masakazu Fukagawa, Teruo Tanaka, and Yasuhiro Inagami. 1993. Parallel processing architecture for the Hitachi S-3800 shared-memory vector multiprocessor. In Proceedings of the 7th international conference on Supercomputing (ICS '93). ACM, New York, NY, USA, 288-297.

(Continued)

*Primary Examiner* — Michelle T Bechtold
(74) *Attorney, Agent, or Firm* — Leveque Intellectual Property Law, PC (57) ABSTRACT

A method and apparatus for monitoring cache transactions in a cache of a data processing system is provided. Responsive to a cache transaction associated with a transaction address, when a cache controller determines that the cache transaction is selected for monitoring, the cache controller retrieves a pointer stored in a register, determines a location in a log memory from the pointer, and writes a transaction identifier to the determined location in the log memory. The transaction identifier is associated with the transaction address and may be a virtual address, for example. The pointer is updated and stored to the register. The architect of the apparatus may include a mechanism for atomically combining data access instructions with an instruction to commence monitoring.

24 Claims, 6 Drawing Sheets

(56) References Cited

U.S. PATENT DOCUMENTS

| | | |
|---|---|---|
| 2005/0114592 A1 | 5/2005 | Jin et al. |
| 2006/0075060 A1* | 4/2006 | Clark .................. G06F 9/30083 |
| | | 709/213 |
| 2011/0119451 A1 | 5/2011 | Fuller et al. |
| 2012/0221774 A1* | 8/2012 | Atkisson ............. G06F 12/0895 |
| | | 711/103 |
| 2014/0136786 A1 | 5/2014 | Carpenter et al. |
| 2015/0113224 A1 | 4/2015 | Achilles et al. |
| 2015/0309742 A1 | 10/2015 | Amidi et al. |
| 2016/0034398 A1* | 2/2016 | Wendel ............... G06F 12/1458 |
| | | 711/129 |
| 2016/0154663 A1* | 6/2016 | Guthrie ............... G06F 11/1458 |
| | | 718/1 |
| 2016/0188414 A1 | 6/2016 | Jayakumar et al. |
| 2019/0042453 A1* | 2/2019 | Basak .................. G06F 12/128 |
| 2020/0142769 A1* | 5/2020 | Mola ................... G06F 11/3636 |

OTHER PUBLICATIONS

Final Office Action for related U.S. Appl. No. 16/418,346, dated Jun. 15, 2021.

* cited by examiner

METHOD AND APPARATUS FOR ARCHITECTURAL CACHE TRANSACTION LOGGING

CROSS-REFERENCE TO RELATED APPLICATIONS

This application is related to the following co-pending U.S. patent application: application Ser. No. 16/418,346 entitled "Method and Apparatus for Asynchronous Memory Write-back in a Data Processing System," filed on even date herewith, which is incorporated herein in its entirety.

BACKGROUND

A processing core of a data processing unit may interact with memory, storage and input/output devices via a private cache, such as a level one (L1) cache. The cache provides fast access to data, compared to main memory and storage devices, so it is advantageous to store copies of often-used data in the cache. However, operation of a private cache is managed by a cache controller and usually hidden from a user application.

Increasingly, instruction set architectures are providing instructions that provide limited control of a cache, such as the ability to write data in a cache line back to memory. This is referred to as 'flushing' or 'cleaning' the cache line.

In addition, there is an increasing interest in systems that enable a computer program to examine, introspect and modify its own structure and behavior at run time. This ability is termed 'reflection'.

Since cache usage is a major component of overall system performance when executing a computer program, it would be beneficial for a processing core to be able to examine the operation of its private cache.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

The various apparatus and devices described herein provide a hardware mechanism for exposing cache operations to a processing core of a data processing system. In one embodiment, the architecture of a data processing system provides in-cache logging of cache transactions.

While this disclosure is susceptible of embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

As used herein, the term processor, processing core, controller or the like may encompass a processor, controller, microcontroller unit (MCU), microprocessor, and other suitable control elements. It will be appreciated that embodiments of the disclosure described herein may be comprised of one or more conventional processors and unique stored program instructions that control the one or more processors to implement, in conjunction with certain non-processor circuits, some, most, or all of the functions described herein. The non-processor circuits may include, but are not limited to, memory devices, an interconnect circuit, signal drivers, clock circuits, power source circuits, and input/output devices. Some or all functions could be implemented by a state machine that has no stored program instructions, or in one or more application specific integrated circuits (ASICs), in which each function or some combinations of certain of the functions are implemented as custom logic. Of course, a combination of these approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present application discloses new architectural facilities for a data processing system. The new facilities improve the operation of the data processing system by providing an ability for user-level applications to examine operation of a cache.

One embodiment provides transaction logging as a general mechanism in the architecture of the data processing system. This may be used, for example, to log coherence (snoop) requests for monitored addresses in a coherent data processing system having multiple processing cores and a shared data resource.

A further embodiment provides an atomic mechanism for activating monitoring for a given address.

In one embodiment, coherence transactions are reflected (recorded) to an in-memory log. All transactions or only selected transactions are recorded. For example, when data enters or leaves the cache, the associated address, referred to as the transaction address, is recorded in a log memory. The log memory may be located in the cache itself or in a dedicated memory. The logging mechanism is implemented in the architecture of the data processing system and is exposed to (accessible by) user programs, even though the user programs may be unprivileged or have a low privilege level. The logging mechanism is independent of processing core execution. For example, the mechanism may be implemented in the circuitry of a cache controller.

The description below assumes that the cache is a private cache of a processing core, such as a level one (L1) cache. However, it will be apparent to those of ordinary skill in the art that the mechanism could be extended to a shared cache or to other memory resources. For example, the cache may be a system cache of a coherence controller or a snoop filter cache. Further, while the example embodiments refers to access by a processor, the logging mechanism may be implemented other devices such as a coherence controller or a snoop filter.

Figure 1:
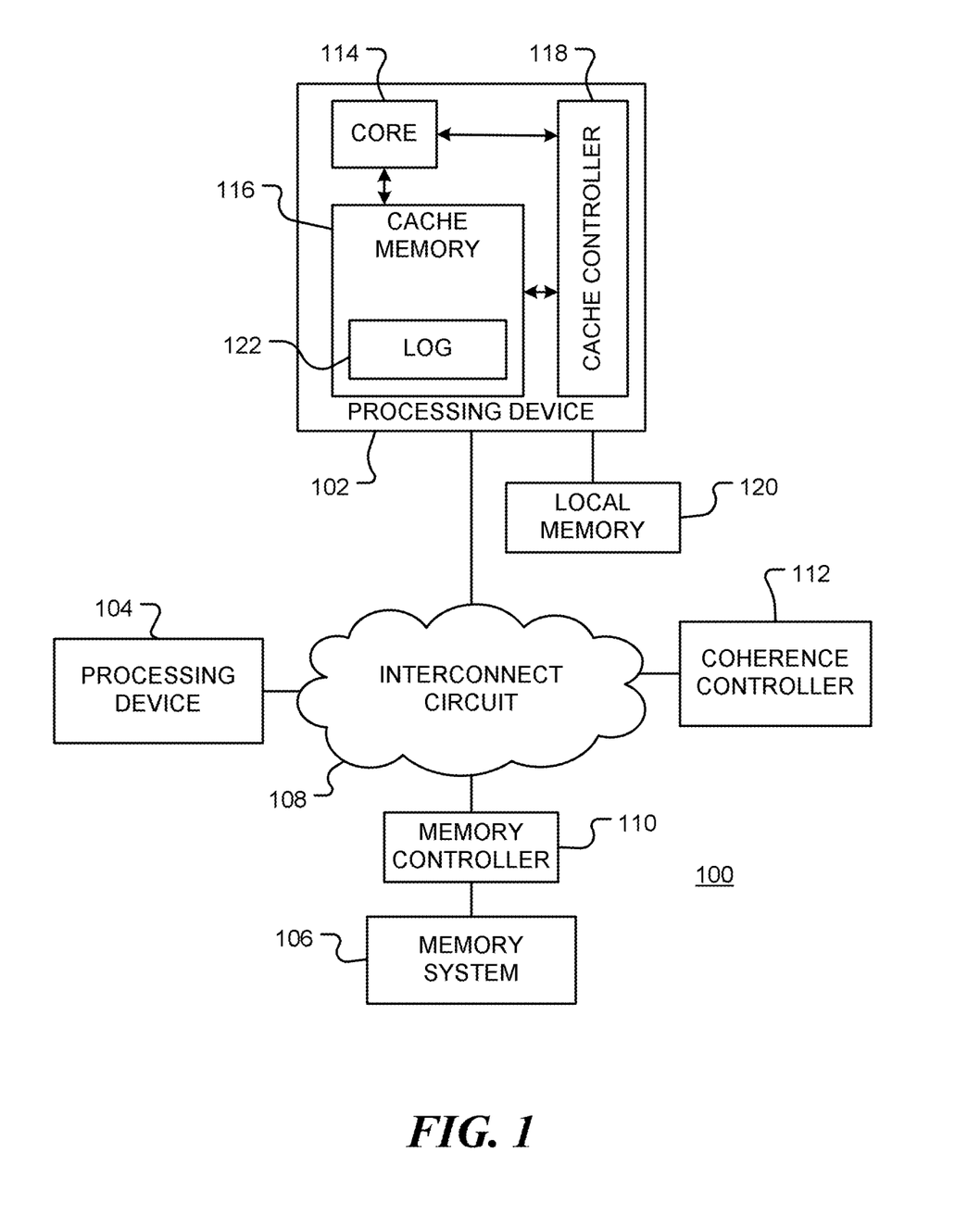
FIG. 1 is a diagrammatic representation of a data processing system, in accordance with various representative embodiments.

FIG. 1 is a diagrammatic representation of a data processing system 100 in accordance with an embodiment of the present disclosure. Referring to FIG. 1, processing devices 102 and 104 share a common data resource—memory system 106 in this embodiment. Any number of processing devices and data resources may be present. The processing devices access memory system 106 via an interconnect circuit 108 and memory controller 110. Memory access requests by processing devices 102 and 104 are monitored and handled by coherence controller 112. A processing device, such as device 102, may include one or more processing cores 114, one or more cache memories 116 and cache controller 118. Coherence controller 118 may send messages (referred to as 'snoop' messages) via the interconnect circuit to other processing devices to retrieve, or change a coherence state of, data stored in a local cache of the processing device. A processing core may have access to one or more local memories 120, such as additional caches or tightly coupled memory having a direct interface to the processing core.

The logging mechanism is described in detail below, however, in the embodiment shown in FIG. 1, the data processing system includes log memory 122 that is a region of cache memory 116 and is maintained by cache controller 118. Log memory 122 may record identifiers of cache transactions such as associated addresses, for example. Other transaction identifiers may be used. Log memory 122 may be a region of cache memory 116, as shown, or in a separate memory, or in combination thereof.

In one embodiment, a transaction logging mechanism is controlled by a system register. The system register may identify the location of a log in memory and, optionally, also allow logging to be enabled and disabled.

In one embodiment, logged events generate a "wait-for-event" (WFE) or other notification message to the processing core that can be used, for example, to wake up the processing core from a sleep mode or to prevent the processing core entering a sleep mode if the log has been updated since last read by the processing core.

While architectural logging of cache transactions is described below, the approach may be generalized to provide logging of other events, e.g., operating system (OS) facilities.

Operating systems are considered to be too slow for high performance input and output (I/O). The architectural logging mechanism described herein replaces some operating system facilities with faster architectural facilities. For example, some or all of the following facilities may be provided in the architecture:

I/O multiplexing facilities, such as select, poll, epoll, /dev/poll, kqueue, I/O completion ports, WaitForMultipleObjects.

Asynchronous read/receive with completion notification (such as aio_read( ) and aio_return( ))

Asynchronous write/send with completion notification (such as aio_write( ) and aio_return( ))

With these facilities, a traditional synchronous programming model can be recreated by a green threaded library layer (a 'green thread' is one that is scheduled by a run-time library or virtual machine, for example, without recourse to an operating system).

In accordance with an embodiment, a system register is provided that points to the tail of a transaction log. Herein, the register is referred to as the "PCTL" register, where "PCTL" is a mnemonic for "Pointer to Cache Transaction Log". The PCTL may be readable and writable at lowest privilege.

The PCTL register may store a virtual address that is translated to a physical address in the same way as a virtual address in normal load and store operations. In one embodiment, for example, an address translator may associate a range of virtual addresses to physical addresses that index a selected region of a data cache. A corresponding region of a cache tag array may store the associated tags.

While the embodiments disclosed below describe a system in which a virtual address is translated to a physical address in a single translation, it will be apparent to those in the art that one or more intermediate levels of address translation may be used. For example, an intermediate address (IA) may be used in place of a physical address (PA). The IA may be then translated at a later time into a physical address which points into the physical memory or storage technology.

Figure 2:
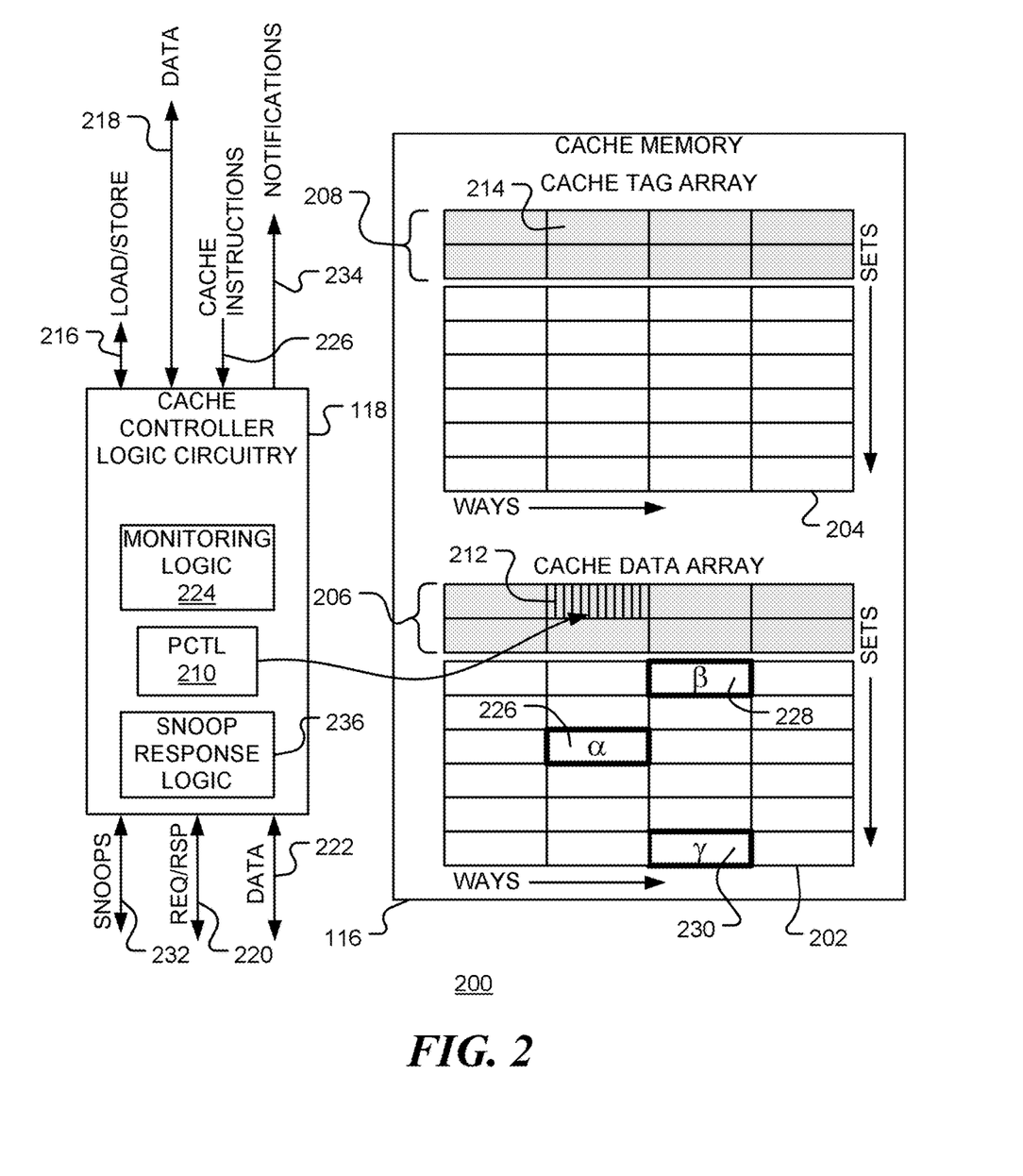
FIG. 2 is a simplified block diagram of a cache, in accordance with various representative embodiments.

FIG. 2 is a simplified block diagram of a cache 200 in accordance with various representative embodiments. The cache includes cache memory 116 and cache controller 118 shown in FIG. 1. Cache memory 116 includes a cache data array 202 and a cache tag array 204. In other embodiments, tags and data may be stored in a common array. A region 206 of cache data array 202 is reserved for storing a cache transaction log. This region is associated with a corresponding region 208 of cache tag array 204. PCTL register 210 may store a virtual address that may be translated to a physical address and used to identify a particular 'set' (logical row) in the data array, in addition to an offset within a block of the set. If the data cache stores values in more than one 'way' (logical column), a corresponding tag may be stored in the cache tag array so that transaction logging may utilize conventional address translation circuitry. For example, in FIG. 2, PCTL register 210 contains a pointer to a word in block 212 of the cache data array 202.

In operation, cache controller 118 may receive load and store instructions 216 from a processing core. In response to a load instruction, for example, cache controller 118 searches the data cache array for the requested data. If found, the data is returned to the processing core on data channel 218. If not found, cache controller 118 sends a request on channel 220 to the memory system and, in response, receives the data on channel 222. The data is then placed in data cache array 202 and returned to the processing core on channel 218. In this example, the cache operates as a 'look-through' cache. However, a similar mechanism may be used for 'look-aside' cache.

Data stored in data cache array 202 may be monitored by monitoring circuitry. All data may be monitored or, alternatively, only selected data is monitored. Cache controller 118 may receive an instruction from the processing core on channel 226 to monitor a particular virtual address. A corresponding block in the cache is then selected for monitoring. For example, data array blocks 226, 228 and 230 (shown in bold), and the corresponding entries in the tag array, may be selected for monitoring. A status of a monitored block may be changed, for example, by a cache instruction (such as a write-back, 'clean' or 'flush' instruction) from the processing core on channel 226. Alternatively, a status may be changed in response to a snoop instruction from a coherent memory system received on channel 232. When the status is changed, the corresponding virtual address is written to the log at the location pointed to by PCTL register 210 and the PCTL register is updated to point to the next available memory location in the log. In addition, cache controller 118 may signal an event to the processing core via a notification message on channel 234. Cache controller 118 also includes snoop response logic circuitry 236 for responding to coherence requests.

Figure 3:
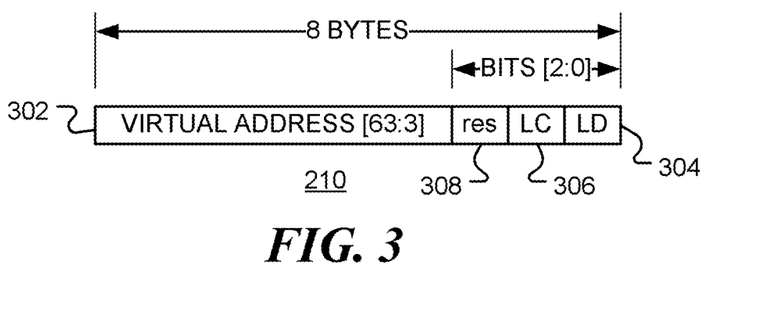
FIG. 3 is a diagrammatic representation of data organization in a system register, in accordance with various representative embodiments.

PCTL register 210 may also be used to enable and disable logging. FIG. 3 is a diagrammatic representation of a PCTL register 210, in accordance with various embodiments. In this example, the register stores a 64-bit virtual address. Registers of other sizes may be used. In embodiments where virtual addresses are aligned to word boundaries, the one or more least significant bits of an address are always zero for a valid (aligned) address. In the example shown in FIG. 3, each word comprises 8 bytes so the least significant three bits are zero for a left-aligned address. Thus, field 302 stores the 61 most significant bits of the virtual address and the remaining 3-bits are used for control and status information. In one embodiment, LD (Logging Disable) bit 304 is a control bit used to enable or disable logging of cache transaction. For example, the PCTL register can be set to the hexadecimal value '0x0001' on reset to disable logging. Log Changed (LC) bit 306 is a status bit used to indicate that the log has changed since the PCTL register was last read by the processing core. Bit 308 may be used as another control or status bit (such as an error bit).

When logging is enabled, whenever coherence requests force evictions of a monitored cache block, the evicted block's virtual address is stored to the memory location pointed to by the PCTL value (denoted as *PCTL), and the PCTL value is incremented, by the word size, to point to the next available memory location.

When the address in the PCTL register experiences a fault during translation (such as finding no mapping information or that the process has no write privilege to the address), a least significant bit (e.g. bit 0) of PCTL may be set, forcing all logging to cease.

In addition to an enable/disable bit, the PCTL register may store a bit in field 304 that is set when the register value is incremented and cleared when the register is read. A "wait for event" instruction will not wait if this bit is set. This can avoid a race condition.

Figure 4A:
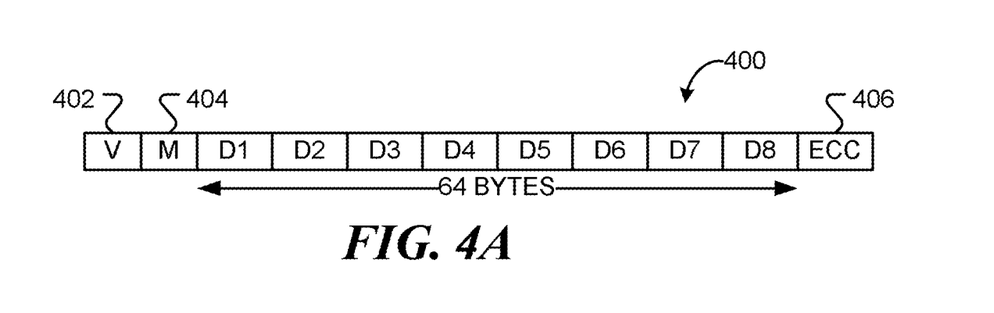
FIG. 4A is a diagrammatic representation of a first data organization in a cache block, in accordance with various representative embodiments.

FIG. 4A is a diagrammatic representation of a cache block 400 used for storing cached data, in accordance with various embodiments. In the example shown, the cache block (or line) contains 64 bytes of data together with a 'validity bit' 402, which indicates if the block contains valid data or not, a 'monitor bit' 404 that indicates if the block is to be monitored or not, and an error correction code (ECC) 406. In this example, each data word comprises 8-bytes (64-bits), so 8 data words (denoted as D1-D8) may be stored in the block.

Figure 4B:
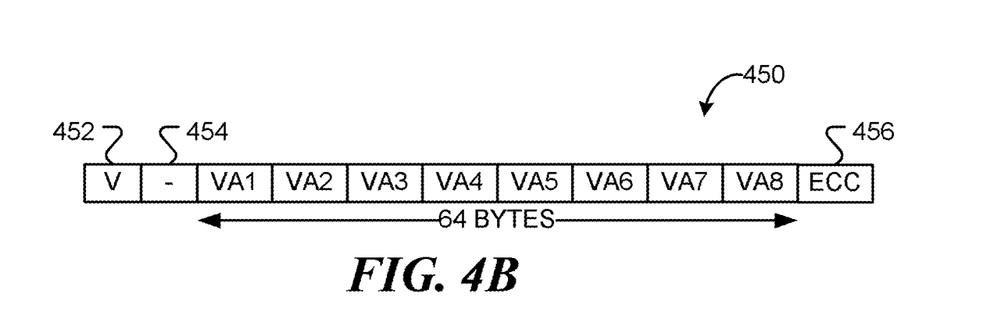
FIG. 4B is a diagrammatic representation of a second data organization in a cache block, in accordance with various representative embodiments.

FIG. 4B is a diagrammatic representation of a cache block 450 used for storing log entries, in accordance with various embodiments. In this example, each virtual address (VA) comprises 8-bytes, so 8 virtual addresses (denoted as VA1-VA8) may be stored in the block. For example, when entries VA1-VA3 are filled (denoting the occurrence of cache transactions at the these monitored addresses) the PCTL register value points to entry VA4. When a next monitored cache transaction occurs, the corresponding virtual address is written to entry VA4 and the PCTL register value is incremented to point to the next available entry, namely VA5. Again, in the example shown, in addition to the 64 bytes for log entries, the block includes a 'validity bit' 452, which indicates if the block contains any valid data or not, and an error correction code (ECC) 456. Bit 454 may be used to store other control or status information. For example, bit 454 may be used to indicate when the block is the last used block in the log memory.

In one embodiment, the architecture provides monitoring circuitry to implement a 'compare-and-monitor' instruction. This instruction enables monitoring of a cache line (equivalently, the cache line "subscribes to" the monitoring service). If the line is lost (e.g. made invalid in response to a snoop request), its address will be logged. In order to avoid missing events, it may be desirable to determine if the data has changed since last accessed by the processing core before deciding to monitor it. Hence the 'compare-and-monitor' instruction is implemented as an atomic instruction, that is, an instruction that completely succeeds or completely fails while other observers (Processing Devices) cannot perform intervening operations or view intermediate states. An example 'compare-and-monitor' (CAM) instruction is:

CAM xD, [xM], xC

Output xD denotes a destination register, the first operand xM is an address operand that denotes an address register and the second operand xC is a data operand that denotes a data register. The CAM instruction atomically compares the data word pointed to by register xM with the value in register xC and, if they match, begin monitoring the cache line storing the data word. If the data does not match, a failure value will be written to destination register xD. If the data matches but the cache has insufficient resources to monitor this cache line (e.g. too many lines are being monitored to guarantee forward progress), a different failure value will be written to xD. Otherwise, a success value will be written to the destination register xD.

In a further embodiment, the architecture provides monitoring circuitry to implement other atomic instructions that initiated monitoring. For example, the architecture may provide 'store-and-monitor' instruction for a virtual address. The virtual address is stored in first register indicated by an address operand of a store-and-monitor instruction received at a cache controller from a processing core of the data processing system. Responsive to the store-and-monitor instruction, the virtual address is translated to a physical address and a first block of the cache memory is identified that is associated with the physical address. The data stored in the first block is replaced with data stored in a data register indicated by a second operand of the store-and-monitor instruction. The first block is then marked as being selected for monitoring. The actions are performed atomically so that no changes to the stored data are missed.

In some applications, it is beneficial to protect against loss of coherence. This may occur, for example, when an intervening write is performed that does not change the compared value. This may not be detected by a compare-and-monitor instruction.

In a still further embodiment, a 'load-linked/monitor-conditional' instruction is provided by the architecture. The 'load-linked' part of the instruction requests that data be loaded from memory associated with a virtual address with an additional requirement that exclusive coherence ownership of the memory is maintained. The 'monitor-conditional' part of the instruction enables monitoring conditional on maintenance of the exclusive coherence state. These actions are performed atomically, so that coherence monitoring begins at the time of the load. If the exclusive coherence ownership is not maintained then the instruction fails and an error value would be returned.

In operation, the PCTL register is initialized to the start of a user-selected buffer space. Referring again to FIG. 2, in the example shown, monitoring is established for three virtual addresses of interest (denoted by α, β, γ). These virtual addresses are stored in blocks 226, 228 and 230, respectively. When another processing element seeks to invalidate data associated with address β, an incoming snoop request is received by the snoop response logic circuitry (236 in FIG. 2). The address β is written to *PCTL (an entry in block 212 in this example), and the PCTL register value is incremented.

Figure 5:
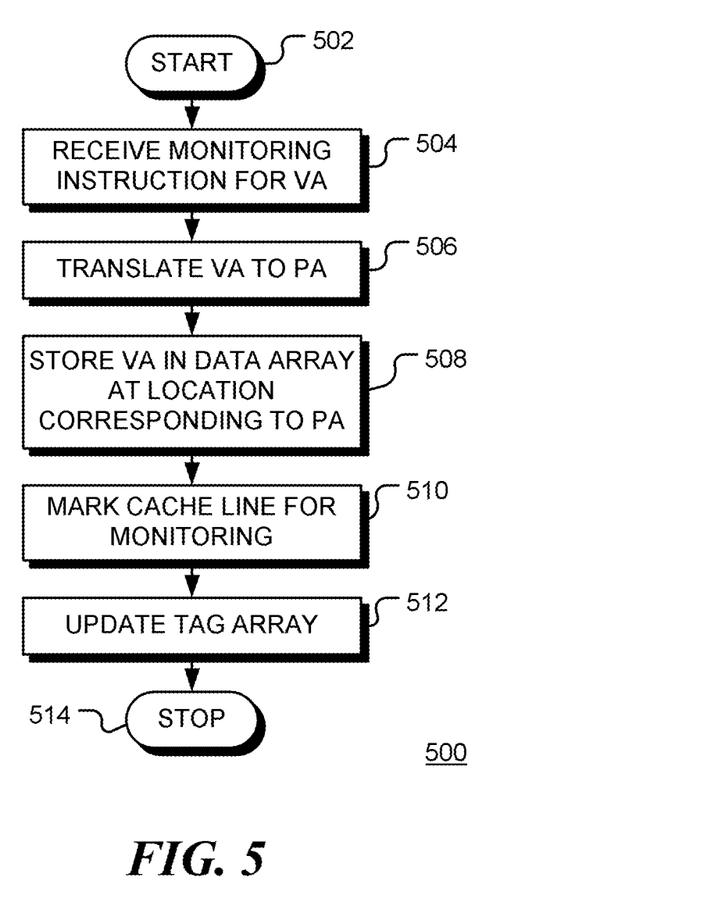
FIG. 5 is a flow chart of a method for implementing a monitoring instruction, in accordance with various representative embodiments.

FIG. 5 is a flow chart 500 of a method of monitoring cache transactions in accordance with various embodiments. Following start block 502, an instruction to monitor a virtual address (VA) is received at a cache controller at block 504. The virtual address (VA) may be provided as an operand in the instruction. The VA is converted to a physical address (PA) at block 506. The VA is then stored in the cache data array at a location determined by the physical address at block 508 and the cache line is marked for monitoring at block 510. The corresponding entry in the tag array is updated with the tag of the physical address at block 512. The tag array entry may be marked as 'valid' while the data array entry is marked as 'invalid' since it contains the VA rather than the data associated with the physical address. The method terminates at block 514.

Figure 6:
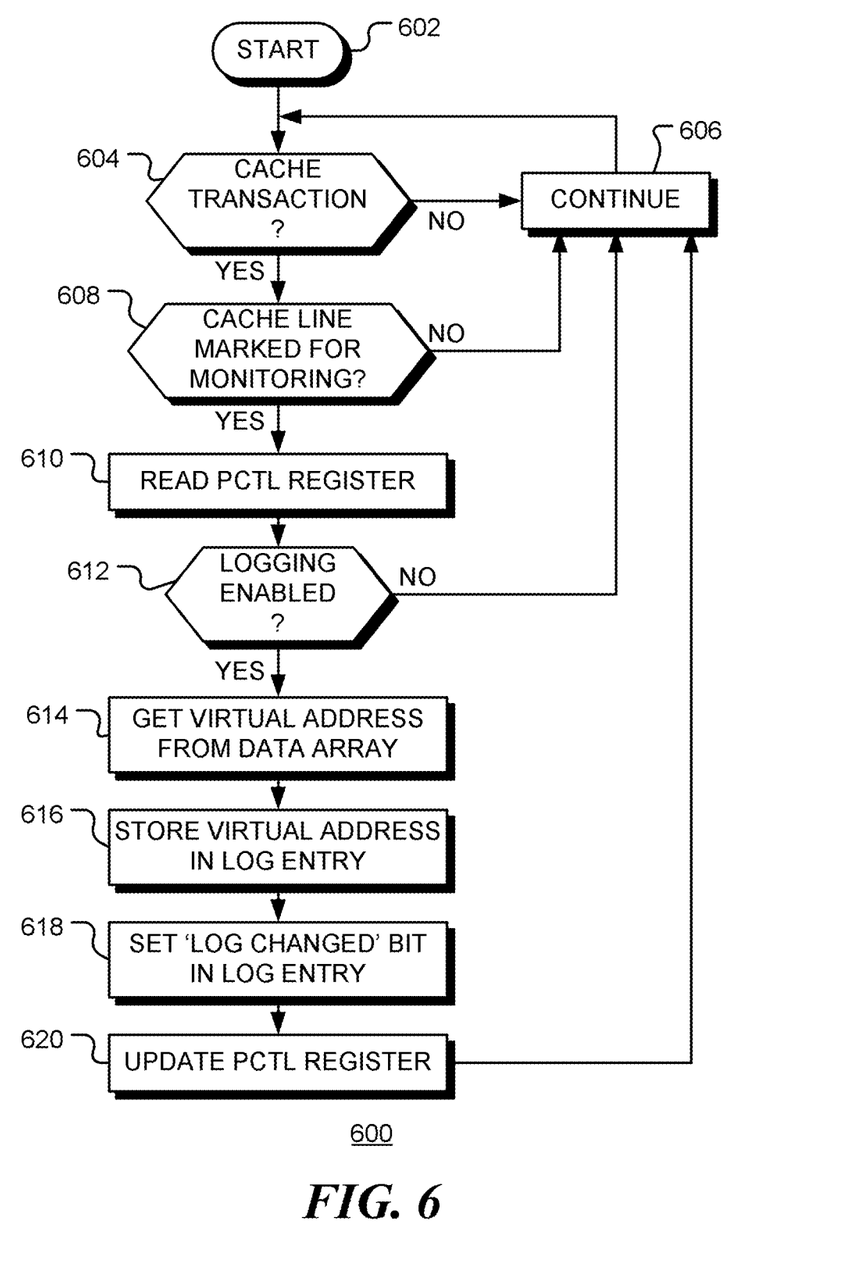
FIG. 6 is a flow chart of a method for monitoring cache transactions, in accordance with various representative embodiments.

FIG. 6 is a flow chart 600 of a method for logging cache transactions, in accordance with the various embodiments. Following start block 602, if no cache transaction has occurred, as depicted by the negative branch from decision block 604, flow continues to block 606 and no action is taken. When a cache transaction has occurred, as depicted by the positive branch from decision block 604, a check is made at decision block 608 to determine if the cache block or line affected by the transaction is marked for monitoring. This may be done by checking the corresponding bit in the data array block corresponding to the physical address associated with the transaction. If the block is not marked for monitoring, as depicted by the negative branch from decision block 608, flow again continues to block 606. If the block is marked for monitoring, as depicted by the positive branch from decision block 608, the PCTL register is read at block 610. If the 'logging disable' (LD) bit of the register is set, logging is disabled and, as depicted by the negative branch from decision block 612, flow continues to block 606. When logging is enabled, as depicted by the positive branch from decision block 612, the virtual address associated with the cache transaction is read from the data array at block 614. At block 616, the virtual address is stored in the log at the address indicated by the PCTL register value. The 'log changed' (LC) bit of the PCTL register is set at block 618 and the PCTL address value is incremented at block 620. It will apparent to those skilled in the art that other formats may be used without departing from the present disclosure.

Monitoring may be halted when a context switch occurs. However other whole-cache operations may continue. In one embodiment, the data array stores a timestamp in addition to the virtual address. The timestamp may be the value of a monotonically increasing micro-architectural counter, for example. In this embodiment, when a monitored cache line holds a counter value that is older than the current counter value, it will be ignored rather than logged by the transaction logging circuitry.

The private cache transaction log may be used to implement a memory multi-wait operation. A compare-and-monitor (CAM) instruction is issued for the tails of all queues. Note that head and tail addresses are the same when a queue is empty. The processing core then repeatedly checks the processing log as the PCTL register value changes. When there is no change, the processing core idles at a "wait-for-event" instruction. Meanwhile, the cache transaction log captures transaction events in the background.

The CAM instruction eliminates a potential race condition (such as a "time of check to time of use" condition), where a memory location is checked and then monitored. Without a mechanism such as the atomic CAM instruction, an event occurring between the check and the monitor enablement would be lost. The CAM instruction atomically verifies that a memory address contains a given value, and if it does, changes its cache line to a "monitored" state. Events pertaining to this "monitored" cache line can then generate notification messages to the processing core through another facility. As described above, the CAM instruction takes at least two input register operands, of which the first operand is a pointer and the second operand is a value, and writes out register output—a status code or syndrome. In the typical usage, a regular load at a point of interest (e.g. tail/tail pointer of a queue) will determine whether an event is pending at the pointed-to location. If not, the CAM instruction will provide the last known value of that memory location, and if last known value matches the current value, monitoring will be enabled. Otherwise, the instruction will return an error condition in the output register—an error value for a value mismatch and a different error value when there are insufficient resources (e.g., monitoring this cache line would leave insufficient cache resources to guarantee progress). The CAM instruction avoids the race condition between checking and monitoring and provides a straightforward way for software to detect the resource constraint. The software can then skip "wait-for-event" instructions and enter a polling loop over elements of the wait set that could not be monitored by this mechanism.

Figure 7:
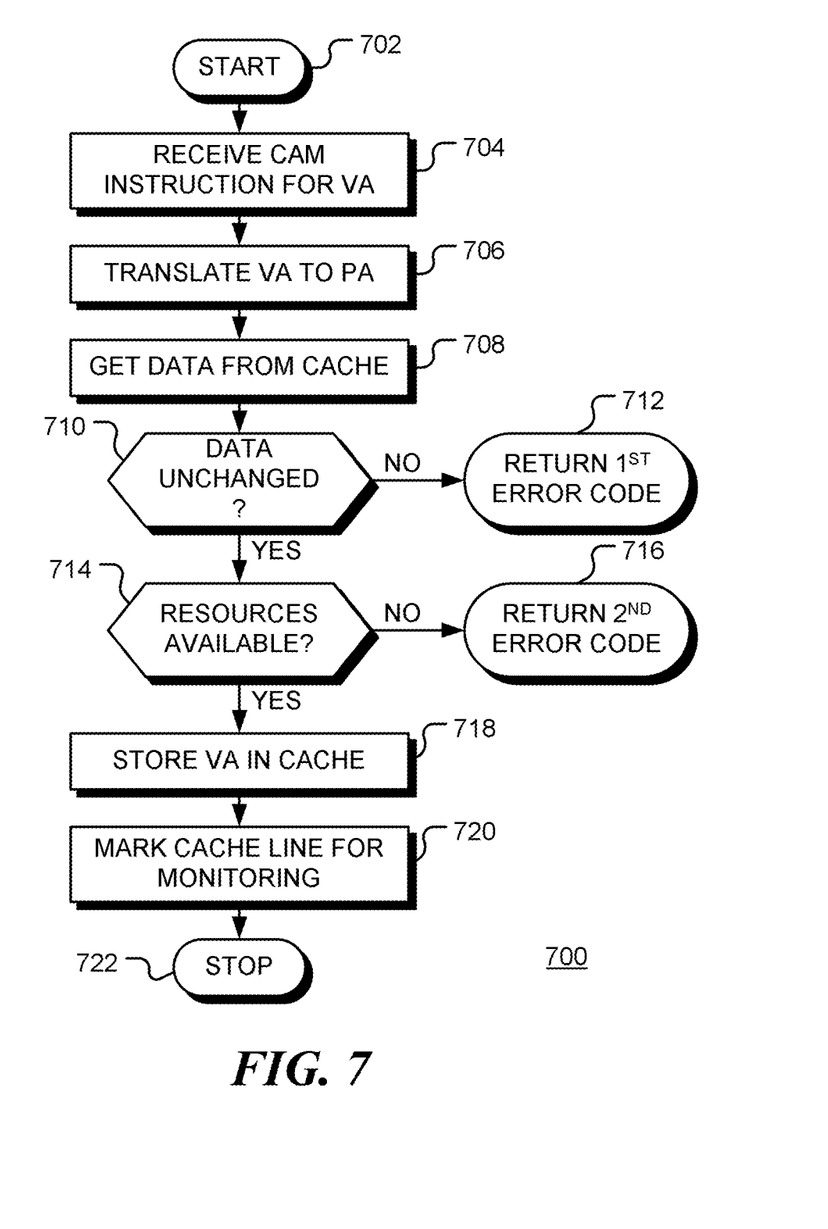
FIG. 7 is a flow chart of a method for implementing a compare-and-monitor instruction, in accordance with various representative embodiments.

FIG. 7 is a flow chart 700 of a method of operation for a 'compare-and-monitor' (CAM) instruction. Following start block 702, a CAM instruction is received at a cache controller at block 704. The virtual address (VA) in the first operand is converted to a physical address (PA) at block 706. The cache data array is accessed dependent upon the physical address at block 708 to retrieve the data associated with the physical address. The data is compared to the value in the register of the second operand at decision block 710. If the values do not match, as depicted by the negative branch from decision block 710, a first error code is returned to the processing core at block 712. Otherwise, if the values match, as depicted by the positive branch from decision block 710, a check is made at decision block 714 to determine if resources are available for transaction logging. When resources are not available, as depicted by the negative branch from decision block 714, a second error code is returned to the processing core at block 716. When resources are available, as depicted by the positive branch from decision block 714, the virtual address (VA) or other transaction identifier is stored in the cache at block 718 the corresponding cache block or line is marked for logging at block 720. The method terminates at block 722.

For physically tagged caches, as commonly used, the Virtual Address (VA) may need to be reconstituted in order to write it into the Log. In one embodiment, the instruction that enables monitoring (e.g. Compare-and-Monitor) changes the cache block to a Valid-Tag, Invalid-Data state. The data array is then used to store the virtual address.

The present application provides a hardware mechanism for logging cache transactions.

In the embodiments described above, the logging mechanism is implemented in a cache controller. However, the disclosed approach is not limited to this implementation. For example, the mechanism could be implemented using independent circuitry.

The present disclosure provides a data processing system in which hardware components provide facilities for improved operation of the data processing system. An ability to monitor cache transactions enables, for example, a processing core to modify its behavior based upon knowledge of cache transactions.

The new features may be included in an instruction set architecture and implemented in hardware in various ways.

The present disclosure could be implemented using hardware components such as special purpose hardware, field programmable gate arrays (FPGAs) and/or dedicated processors or a combination thereof. These are equivalents to the disclosure as described and claimed.

The hardware components may be described by instructions of a hardware description language or a netlist stored on a non-transitory computer readable medium. These descriptions, in turn, may be used in the design and implementation of a data processing system.

Some aspects and features of the disclosed embodiments are set out in the following numbered items:

1. A method for monitoring cache transactions in a cache of a data processing system, where the cache comprises a cache memory and a cache controller, the method comprising: responsive to a cache transaction associated with a transaction address: determining, by the cache controller, if the cache transaction is selected for monitoring; when the cache transaction is selected for monitoring, the cache controller: retrieving a pointer stored in a register; determining a location in a log memory from the pointer; writing a transaction identifier to the determined location in the log memory, where the transaction identifier is associated with the transaction address; and storing an updated pointer to the register.

2. The method of item 1, where determining, by the cache controller, if the cache transaction is selected for monitoring comprises: accessing a cache line of the cache memory, where the cache line is associated with the transaction address; and determining if the cache line is marked for monitoring.

3. The method of item 1, further comprising mapping the transaction address to the transaction identifier.

4. The method of item 1, further comprising, when the cache transaction is selected for monitoring, the cache controller sending a notification message to a processing core of the data processing system, where the processing core is coupled to the cache.

5. The method of item 1, where the transaction identifier comprises a virtual address and where the virtual address is stored in a first register indicated by an address operand of a first instruction received at the cache controller from a processing core of the data processing system, the method further comprising: responsive to the first instruction: translating the virtual address to a physical address; identifying a first block of the cache memory associated with the physical address; storing the virtual address in the first block of the cache memory; and marking the first block of the cache memory as being selected for monitoring.

6. The method of item 1, where the transaction identifier comprises a virtual address and where the virtual address is stored in a first register indicated by an address operand of a first instruction received at the cache controller from a processing core of the data processing system, the method further comprising: responsive to the first instruction: translating the virtual address to a physical address; determining when resources are available for logging a cache transaction; when resources are available: identifying a first block of the cache memory associated with the physical address; storing the virtual address in the first block of the cache memory; and marking the first block of the cache memory as being selected for monitoring; and when resources are not available, returning an error code to the processing core.

7. The method of item 1, where the transaction identifier comprises a virtual address and where the virtual address is stored in first register indicated by an address operand of a compare-and-monitor instruction received at the cache controller from a processing core of the data processing system, the method further comprising: responsive to the compare-and-monitor instruction: translating the virtual address to a physical address; identifying a first block of the cache memory associated with the physical address; comparing data stored in the first block with data stored in a data register indicated by a second operand of the compare-and-monitor instruction; and marking the first block as being selected for monitoring when the data stored in the first block matches the data stored in the data register.

8. The method of item 1, where the transaction identifier comprises a virtual address and where the virtual address is stored in a first register indicated by an address operand of a store-and-monitor instruction received at the cache controller from a processing core of the data processing system, the method further comprising: responsive to the store-and-monitor instruction, atomically performing: translating the virtual address to a physical address; identifying a first block of the cache memory associated with the physical address; replacing data stored in the first block with data stored in a data register indicated by a second operand of the store-and-monitor instruction; and marking the first block as being selected for monitoring.

9. The method of item 1, where the transaction identifier comprises a virtual address and the cache transaction comprises a change of coherence state, where the virtual address is stored in a first register indicated by an address operand of an instruction received at the cache controller from a processing core of the data processing system, the method further comprising: responsive to the instruction, atomically performing: monitoring a coherence state of data associated with the virtual address; accessing the virtual address with a load or store operation; marking a block of the cache associated with the virtual address as being selected for monitoring when the coherence state is maintained; and returning an error signal when the coherence state is not maintained.

10. The method of item 1, where the pointer comprises a virtual address of a next log memory location available for a log entry and where storing an updated pointer to the register comprises incrementing the pointer and storing the incremented pointer to the register.

11. The method of item 1, further comprising: setting, by a processing core of the data processing system, a first bit in the register when the monitoring of cache transaction is disabled; and clearing, by the processing core of the data processing system, the first bit in the register when the monitoring of cache transaction is enabled.

12. The method of item 1, further comprising: setting, by the cache controller, a second bit in the register when the register is updated; and clearing, by the cache controller, the second bit in the register when the register is updated.

13. The method of item 1, further comprising: reading, by a processing core of the data processing system, a value stored in the register; determining, from the value, a location in the log memory from the pointer; and reading, by the processing core, at least part of the log memory dependent upon the pointer.

14. The method of item 13, further comprising: determining, by the processing core, from the first value, if the log memory has changed since the log memory was last read by the processing core.

15. The method of item 1, further comprising marking a cache line with a timestamp when it is selected for monitoring, where a monitored cache line is not logged when the timestamp of the cache line is older than a current time.

16. A data processing apparatus comprising: a cache comprising a cache memory and a cache controller; a device coupled to the cache; a log memory accessible by the cache controller and the processing core; and a register accessible by the cache controller and the device; where the cache controller comprises monitoring circuitry that, responsive to a cache transaction associated with a first memory address: retrieves a pointer stored in the register; determines a location in the log memory from the pointer; writes the first memory address to the determined location in the log memory; and stores an updated pointer to the register.

17. The data processing apparatus of item 16, where log memory comprises a region of the cache memory.

18. The data processing apparatus of item 17, where the cache memory comprises a plurality of data blocks and where each data block of the plurality of data blocks is associated with a control bit that indicates when the data block is selected for monitoring by the monitoring circuitry.

19. The data processing apparatus of item 16, where the monitoring circuitry: determines, from a first bit of the register, when monitoring of cache transaction is enabled; and sets a second bit of the register when the log memory has been updated; and clears the second bit of the register when the register is read by the device.

20. The data processing apparatus of item 16, where the monitoring circuitry sends a notification message to the device when the log memory is updated.

21. The data processing apparatus of item 16, where the device comprises a processing core and where the monitoring circuitry, responsive to a compare-and-monitor instruction received at the cache controller from the processing core: identifies a first block of the cache memory associated with an address stored in an address register indicated by a first operand of the compare-and-monitor instruction; compares data stored in the first block with data stored in a data register indicated by second operand of the compare-and-monitor instruction; and marks the first block as being selected for monitoring when the data stored in the first block matches the data stored in the data register.

22. The data processing apparatus of item 21, where the response of the monitoring circuitry to the compare-and-monitor instruction is performed atomically.

23. A non-transitory computer readable medium storing instructions of a hardware description language or netlist that describe the apparatus of item 16.

24. A data processing apparatus comprising: a device; a cache accessible by the device; a log memory accessible by the device; and a register accessible by the device; where the device comprises monitoring circuitry that, responsive to a cache transaction associated with a first memory address: retrieves a pointer stored in the register; determines a location in the log memory from the pointer; writes the first memory address to the determined location in the log memory; and stores an updated pointer to the register.

25. The data processing apparatus of item 24, where the device comprises one or more of a cache controller of the cache and a coherence controller.

26. The data processing apparatus of item 24, where the cache comprises one or more of a local cache of a processor of the data processing system, a system cache accessible by the coherence controller and a snoop filter cache accessible by the coherence controller.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended items.

The invention claimed is:

1. A method for monitoring cache transactions in a cache of a data processing system, where the cache comprises a cache memory and a cache controller, the method comprising:
  responsive to receiving a compare-and-monitor or store-and-monitor instruction having a first operand that indicates an address register and a second operand that indicates a data register, the cache controller:
    identifying a block of the cache memory associated with a value stored in the address register;
    in response to the compare-and-monitor instruction, atomically performing:
      comparing, by the cache controller, data stored in the block of the cache memory with data stored in the data register; and
      marking the block of cache memory as being selected for monitoring when the data stored in the block of the cache memory matches the data stored in the data register;
    in response to the store-and-monitor instruction, atomically performing:
      replacing data stored in the block of the cache memory with data stored in the data register indicated by the second operand of the store-and-monitor instruction; and
      marking the block of the cache memory as being selected for monitoring, and
  responsive to a cache transaction associated with a transaction address:
    determining, by the cache controller, if the cache transaction is selected for monitoring;
    in response to determining the cache transaction is selected for monitoring, the cache controller:
      retrieving a pointer stored in a register;
      determining a location in a log memory from the pointer;
      writing a transaction identifier to the determined location in the log memory, where the transaction identifier is associated with the transaction address; and
      storing an updated pointer to the register.

2. The method of claim 1, where determining, by the cache controller, if the cache transaction is selected for monitoring comprises:
  accessing a cache line of the cache memory, where the cache line is associated with the transaction address; and
  determining if the cache line is marked for monitoring.

3. The method of claim 1, further comprising mapping the transaction address to the transaction identifier.

4. The method of claim 1, further comprising, when the cache transaction is selected for monitoring, the cache controller sending a notification message to a processing core of the data processing system, where the processing core is coupled to the cache.

5. The method of claim 1, where the transaction identifier comprises a virtual address and where the virtual address is stored in the address register, the method further comprising:
  responsive to the compare-and-monitor instruction or the store-and-monitor instruction:
    translating the virtual address to a physical address;
    identifying the block of the cache memory based on the physical address; and
    storing the virtual address in the first block of the cache memory.

6. The method of claim 1, where the transaction identifier comprises a virtual address and where the virtual address is stored in the address register, the method further comprising:
  responsive to the compare-and-monitor instruction or the store-and-monitor instruction:
    translating the virtual address to a physical address;
    determining when resources are available for logging a cache transaction;
    when resources are available:
      identifying the block of the cache memory based on the physical address;
      storing the virtual address in the first block of the cache memory; and
    when resources are not available, returning an error code to the processing core.

7. The method of claim 1, where the value stored in the address register indicated by the first address operand of the compare-and-monitor instruction is a virtual address, the method further comprising:
  responsive to the compare-and-monitor instruction:
    translating the virtual address to a physical address; and
    identifying the block of the cache memory based on the physical address.

8. The method of claim 1, where the value stored in the address register indicated by the first address operand of the store-and-monitor instruction is a virtual address, the method further comprising:
  responsive to the store-and-monitor instruction, atomically performing:
    translating the virtual address to a physical address; and
    identifying the block of the cache memory based on the physical address.

9. A method for monitoring cache transactions in a cache of a data processing system, where the cache comprises a cache memory and a cache controller, the method comprising:
  responsive to a cache transaction associated with a transaction address:
    determining, by the cache controller, the cache transaction is selected for monitoring;
    in response to determining the cache transaction is selected for monitoring, the cache controller:
      retrieving a pointer stored in a register;
      determining a location in a log memory from the pointer;
      writing a transaction identifier to the determined location in the log memory, where the transaction identifier is associated with the transaction address;
      storing an updated pointer to the register;
  where the transaction identifier comprises a virtual address and the cache transaction comprises a change of coherence state, where the virtual address is stored in a first register indicated by an address operand of an instruction received at the cache controller from a processing core of the data processing system, the method further comprising:
    responsive to the instruction, atomically performing:
    monitoring a coherence state of data associated with the virtual address;
    accessing the virtual address with a load or store operation;
    marking a block of the cache associated with the virtual address as being selected for monitoring when the coherence state is maintained; and
    returning an error signal when the coherence state is not maintained.

10. The method of claim 1, where the pointer comprises a virtual address of a next log memory location available for a log entry and where storing an updated pointer to the register comprises incrementing the pointer and storing the incremented pointer to the register.

11. The method of claim 1, further comprising:
setting, by a processing core of the data processing system, a bit in the register when the monitoring of cache transaction is disabled; and
clearing, by the processing core of the data processing system, the bit in the register when the monitoring of cache transaction is enabled.

12. The method of claim 1, further comprising:
setting, by the cache controller, a bit in the register when the register is updated; and
clearing, by the cache controller, the bit in the register when the register is read.

13. The method of claim 1, further comprising:
reading, by a processing core of the data processing system, a value stored in the register;
determining, from the value, a location in the log memory from the pointer; and
reading, by the processing core, at least part of the log memory dependent upon the pointer.

14. The method of claim 13, further comprising:
determining, by the processing core, from the value stored in the register, if the log memory has changed since the log memory was last read by the processing core.

15. The method of claim 1, further comprising marking a cache line with a timestamp when it is selected for monitoring, where a monitored cache line is not logged when the timestamp of the cache line is older than a current time.

16. A data processing apparatus comprising:
a cache comprising a cache memory and a cache controller;
a processing core coupled to the cache;
a log memory accessible by the cache controller and the processing core; and
a register accessible by the cache controller and the processing core;
where the cache controller comprises monitoring circuitry that:
responsive to a compare-and-monitor or store-and-monitor instruction received at the cache controller from the processing core:
identifies a first block of the cache memory associated with an address stored in an address register indicated by a first operand of the instruction;
in response to the compare-and-monitor instruction:
compares data stored in the first block of the cache memory with data stored in a data register indicated by a second operand of the compare-and-monitor instruction; and
marks the block as being selected for monitoring when the data stored in the first block of the cache memory matches the data stored in the data register, and
in response to the store-and-monitor instruction:
replaces data stored in the first block of the cache memory with data stored in a data register indicated by a second operand of the store-and-monitor instruction; and
marks the block as being selected for monitoring; and
responsive to a cache transaction associated with a first memory address:
retrieves a pointer stored in the register;
determines a location in the log memory from the pointer;
writes the first memory address to the determined location in the log memory; and
stores an updated pointer to the register.

17. The data processing apparatus of claim 16, where the monitoring circuitry:
determines, from a first bit of the register, when monitoring of cache transaction is enabled; and
sets a second bit of the register when the log memory has been updated; and
clears the second bit of the register when the register is read by the processing core.

18. The data processing apparatus of claim 16, where the monitoring circuitry sends a notification message to the processing core when the log memory is updated.

19. The data processing apparatus of claim 16, where the response of the monitoring circuitry to the store-and-monitor instruction is performed atomically.

20. The data processing apparatus of claim 16, where the response of the monitoring circuitry to the compare-and-monitor instruction is performed atomically.

21. A non-transitory computer readable medium storing instructions of a hardware description language or netlist that describe the apparatus of claim 16.

22. A data processing apparatus comprising:
a device;
a cache accessible by the device;
a log memory accessible by the device; and
a register accessible by the device;
where the device includes monitoring circuitry that,
responsive to receiving an instruction from a processing core of the device, an address operand of the instruction indicating a first register that stores a first memory address, atomically performs:
monitoring a coherence state of data associated with the first memory address;
accessing the first memory address with a load or store operation; and
marking a block of the cache associated with the first memory address as being selected for monitoring when the coherence state is maintained; and
returning an error signal when the coherence state is not maintained; and responsive to a cache transaction associated with the first memory address:
determines the cache transaction is selected for monitoring; and
in response to determining the cache transaction is selected for monitoring,
retrieves a pointer stored in the register;
determines a location in the log memory from the pointer;
writes the first memory address to the determined location in the log memory; and
stores an updated pointer to the register.

23. The data processing apparatus of claim 22, where the device comprises one or more of a cache controller of the cache and a coherence controller.

24. The data processing apparatus of claim 22, where the cache comprises one or more of a local cache of a processor of the data processing system, a system cache accessible by the coherence controller and a snoop filter cache accessible by the coherence controller.

* * * * *